(12) United States Patent
Kerprich et al.

(10) Patent No.: US 8,968,058 B2
(45) Date of Patent: Mar. 3, 2015

(54) POLISHING PAD WITH ALIGNMENT FEATURE

(75) Inventors: Robert Kerprich, Portland, OR (US); William C. Allison, Beaverton, OR (US); Diane Scott, Portland, OR (US)

(73) Assignee: NexPlanar Corporation, Hillsboro, OR (US)

( * ) Notice: Subject to any disclaimer, the term of this patent is extended or adjusted under 35 U.S.C. 154(b) by 572 days.

(21) Appl. No.: 13/101,826

(22) Filed: May 5, 2011

(65) Prior Publication Data

US 2012/0282849 A1    Nov. 8, 2012

(51) Int. Cl.
| | |
|---|---|
| B24D 11/00 | (2006.01) |
| B29C 44/22 | (2006.01) |
| B29C 44/04 | (2006.01) |
| B24B 37/20 | (2012.01) |
| B24B 37/26 | (2012.01) |
| B24D 18/00 | (2006.01) |
| B24B 37/005 | (2012.01) |

(52) U.S. Cl.
CPC ............. *B24B 37/005* (2013.01); *B24B 37/205* (2013.01); *B24B 37/26* (2013.01); *B24D 18/0009* (2013.01)
USPC .......................................... 451/527; 451/539

(58) Field of Classification Search
USPC .......... 451/287, 36, 41, 526–529, 533, 539, 6
See application file for complete search history.

(56) References Cited

U.S. PATENT DOCUMENTS

| | | | | |
|---|---|---|---|---|
| 3,353,308 | A * | 11/1967 | Zane | 451/529 |
| 5,243,790 | A * | 9/1993 | Gagne | 451/528 |
| 6,089,966 | A * | 7/2000 | Arai et al. | 451/533 |
| 6,220,942 | B1 * | 4/2001 | Tolles et al. | 451/65 |
| 6,648,743 | B1 * | 11/2003 | Burke | 451/526 |
| 6,685,548 | B2 * | 2/2004 | Chen et al. | 451/526 |
| 6,848,977 | B1 * | 2/2005 | Cook et al. | 451/41 |
| 6,942,549 | B2 * | 9/2005 | Khoury | 451/41 |
| 7,004,823 | B2 * | 2/2006 | Kisboll et al. | 451/57 |
| 7,329,174 | B2 * | 2/2008 | Hosaka et al. | 451/527 |
| 7,357,703 | B2 * | 4/2008 | Nishimura et al. | 451/527 |
| 2004/0127145 | A1 * | 7/2004 | Takahashi et al. | 451/6 |
| 2005/0124273 | A1 * | 6/2005 | Swedek et al. | 451/528 |
| 2005/0260929 | A1 * | 11/2005 | Shiho et al. | 451/41 |
| 2009/0053976 | A1 | 2/2009 | Roy et al. | |
| 2009/0081932 | A1 * | 3/2009 | O'Moore | 451/490 |
| 2009/0258587 | A1 * | 10/2009 | Feng et al. | 451/527 |
| 2009/0311955 | A1 * | 12/2009 | Kerprich et al. | 451/548 |

(Continued)

FOREIGN PATENT DOCUMENTS

| | | |
|---|---|---|
| JP | 2003-205451 | 7/2003 |
| JP | 2009-148892 | 7/2009 |

(Continued)

OTHER PUBLICATIONS

International Search Report and Written Opinion from PCT/US2012/034717 mailed Aug. 2, 2012, 13 pgs.

(Continued)

*Primary Examiner* — Lee D Wilson
*Assistant Examiner* — Tyrone V Hall, Jr.
(74) *Attorney, Agent, or Firm* — Blakely Sokoloff Taylor Zafman LLP

(57) ABSTRACT

Polishing pads with alignment marks are described. Methods of fabricating polishing pads with alignment marks are also described.

16 Claims, 14 Drawing Sheets

(56) References Cited

U.S. PATENT DOCUMENTS

2010/0216378 A1* 8/2010 Choi et al. ............... 451/287
2010/0330879 A1* 12/2010 Paik et al. ............... 451/6

FOREIGN PATENT DOCUMENTS

| WO | 2004/009291 | 1/2004 |
| WO | 2008/114805 | 9/2008 |
| WO | 2012/051197 | 4/2012 |

OTHER PUBLICATIONS

International Preliminary Report on Patentability from PCT/US2012/034717 mailed Nov. 14, 2013, 9 pgs.

Office Action from Taiwan Patent Application No. 101116093 mailed Apr. 29, 2014, 5 pgs.

* cited by examiner

POLISHING PAD WITH ALIGNMENT FEATURE

TECHNICAL FIELD

Embodiments of the present invention are in the field of chemical mechanical polishing (CMP) and, in particular, polishing pads with alignment features.

BACKGROUND

Chemical-mechanical planarization or chemical-mechanical polishing, commonly abbreviated CMP, is a technique used in semiconductor fabrication for planarizing a semiconductor wafer or other substrate.

The process uses an abrasive and corrosive chemical slurry (commonly a colloid) in conjunction with a polishing pad and retaining ring, typically of a greater diameter than the wafer. The polishing pad and wafer are pressed together by a dynamic polishing head and held in place by a plastic retaining ring. The dynamic polishing head is rotated during polishing. This approach aids in removal of material and tends to even out any irregular topography, making the wafer flat or planar. This may be necessary in order to set up the wafer for the formation of additional circuit elements. For example, this might be necessary in order to bring the entire surface within the depth of field of a photolithography system, or to selectively remove material based on its position. Typical depth-of-field requirements are down to Angstrom levels for the latest sub-50 nanometer technology nodes.

The process of material removal is not simply that of abrasive scraping, like sandpaper on wood. The chemicals in the slurry also react with and/or weaken the material to be removed. The abrasive accelerates this weakening process and the polishing pad helps to wipe the reacted materials from the surface. In addition to advances in slurry technology, the polishing pad plays a significant role in increasingly complex CMP operations.

However, additional improvements are needed in the evolution of CMP pad technology.

SUMMARY

Embodiments of the present invention include polishing pads with alignment features.

In an embodiment, a polishing pad for polishing a substrate includes a polishing body. The polishing body has a polishing surface and a back surface. The polishing surface has a pattern of grooves including a polishing region, the polishing region including an alignment feature.

In another embodiment, a method of fabricating a polishing pad for polishing a substrate includes mixing a pre-polymer and a curative to form a mixture in the base of a formation mold. The lid of the formation mold is moved into the mixture. The lid has disposed thereon a pattern of protrusions and an alignment forming feature. With the lid placed in the mixture, the mixture is at least partially cured to form a molded homogeneous polishing body including a polishing surface. The polishing surface has a pattern of grooves including a polishing region with an alignment feature disposed therein, corresponding to the pattern of protrusions and the alignment forming feature of the lid.

DETAILED DESCRIPTION

Figure 1:
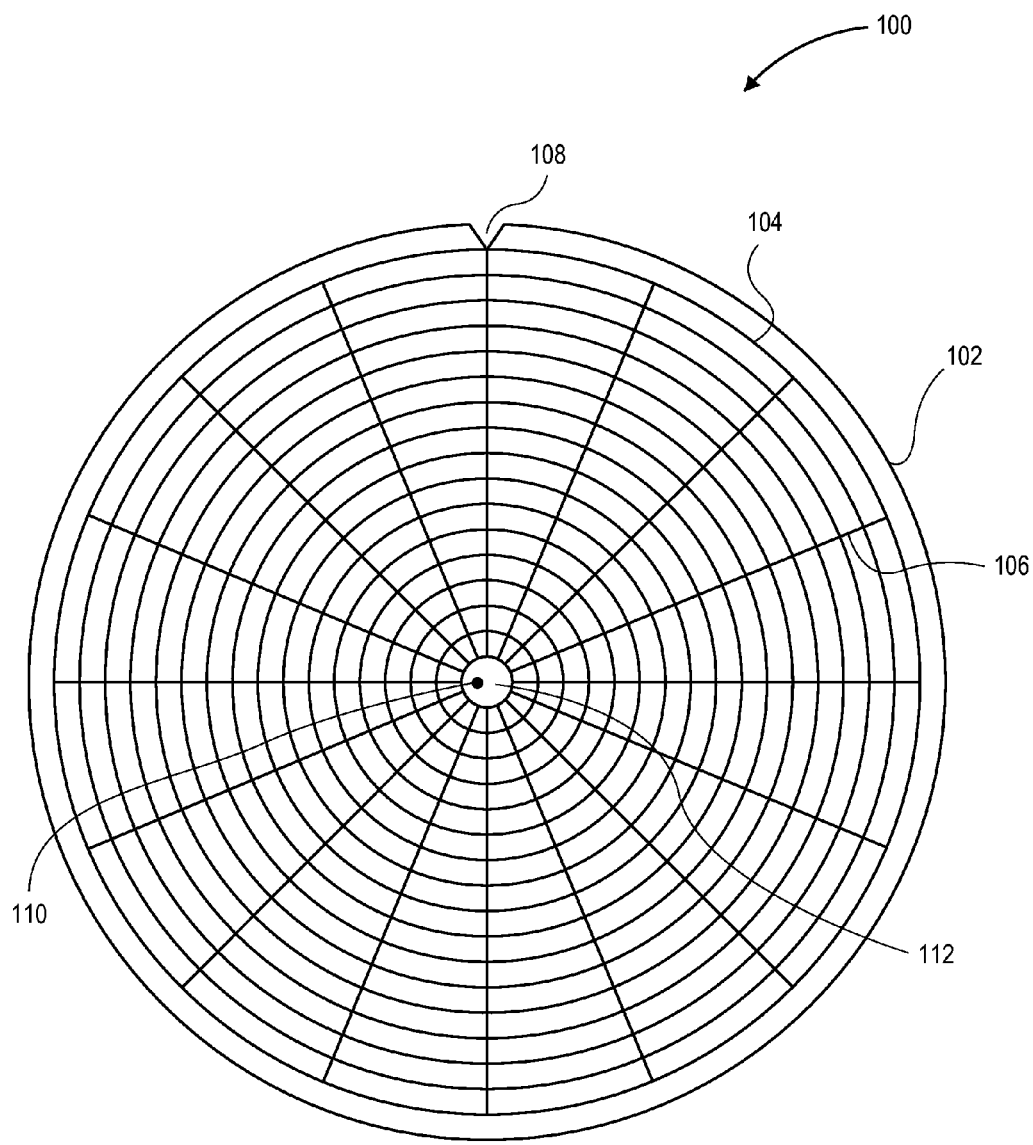
FIG. 1 illustrates a top-down plan view of a polishing surface having noted or punctured alignment features disposed therein.

Polishing pads with alignment features are described herein. In the following description, numerous specific details are set forth, such as specific polishing pad compositions and designs, in order to provide a thorough understanding of embodiments of the present invention. It will be apparent to one skilled in the art that embodiments of the present invention may be practiced without these specific details. In other instances, well-known processing techniques, such as details concerning the combination of a slurry with a polishing pad to perform CMP of a semiconductor substrate, are not described in detail in order to not unnecessarily obscure embodiments of the present invention. Furthermore, it is to be understood that the various embodiments shown in the figures are illustrative representations and are not necessarily drawn to scale.

Polishing pads for polishing substrates in CMP operations typically include at least one surface with physical grooves formed therein. The grooves may be arranged to balance an appropriate amount of surface area for polishing the substrate while providing a reservoir for slurry used in the CMP operation. In accordance with embodiment of the present invention, groove patterns that further include alignment features are described herein. As an example, a polishing pad with a polishing surface has a groove pattern based on circumferential grooves intersecting with radial grooves. An alignment feature is also included in the polishing surface. The alignment feature indicates the orientation of the polishing pad within a mold in which the polishing pad is formed. Thus, in an aspect of the invention, compression molding may be used to form an alignment mark as the pad and the groove pattern is being formed.

Embodiments described herein may include visible and tactile alignment marks formed in or on the polishing side of a CMP polishing pad. Such alignment marks may also be referred to as clock marks. A possible advantage for including an alignment mark as a design feature on a CMP pad includes an ability of traceability of the pad. For example, an alignment feature may indicate the orientation of the pad in the mold in which it was originally formed. Traceability for every detail of a CMP pad may be important to users of CMP pads since it may enable an ability to trace the detail of every pad's manufacture. Embodiments of the present invention may provide for one or more alignment marks to be easily identified on a pad through its entire usage life, e.g., for as long as groove depth remains on the pad. This approach may enable traceability on used pads as well as on unused pads. Thus, in a specific embodiment, the alignment feature lasts the duration of the polishing life of the polishing pad. Furthermore, as described below, certain embodiments include alignment features that do not interfere with pad locations used for pad quality measurements. Also, certain embodiments include alignment features that do not interrupt either the smooth circular shape of the pad or the intact edge of the pad.

Some embodiments of the present invention include the inclusion of an interruption or other singular asymmetry in a pattern of grooves and polish areas in the top surface of the pad. Such an alignment feature may be visible, for example, where the feature extends from the original polish surface of the pad to at least the depth of the groove pattern in the pad. Examples of some embodiments include: an additional short segment of groove running radially between two circumferential grooves (e.g., as described below in association with FIG. 2), an additional short segment of tangential groove running between two radial grooves (e.g., as described below in association with FIG. 3), a missing short segment of a tangential groove running between two radial grooves (e.g., as described below in association with FIG. 4), a missing short segment of a radial groove (e.g., as described below in association with FIG. 5), a segment of a radial groove which is wider or narrower than the rest of the radial groove and the other radial grooves on the pad (e.g., as described below in association with FIGS. 6 and 7), or a segment of a circumferential groove which is wider or narrower than the rest of the circumferential grooves on the pad (e.g., as described below in association with FIGS. 6 and 7).

Conventional polishing pads typically have alignment marks formed by notching a pad or by puncturing a "button" in the center of the pad. For example, FIG. 1 illustrates a top-down plan view of a polishing surface having noted or punctured alignment features disposed therein.

Referring to FIG. 1, a polishing pad 100 includes a polishing body having a polishing surface 102 and a back surface (not shown). The polishing surface 102 has a pattern of grooves of concentric circles 104. The pattern of grooves also includes a plurality of radial grooves 106 continuous from the inner most circle to the outer most circle, as depicted in FIG. 1. A first alignment mark 108 is included as a notch removed from the edge of polishing pad 100. A second alignment mark 110 is included as a puncture formed in the button 112 of polishing pad 100. It is to be understood that alignment marks 108 and 110 need not be included together in the same polishing pad. The potential drawbacks of alignment marks 108 and 110 are described below with respect to specific embodiments of the present invention.

Regarding alignment mark 110 formed in button 112, such a puncture alignment mark is typically shallow and therefore does not last throughout the polishing life of polishing pad 100. Furthermore, since the button of 112 of the polishing pad 100 may be used for property measurements of the pad, alignment mark 110 may interfere with pad property measurements that are made in such a non-polishing region of the pad. The pad property measurements may be required for pad quality data collection. Regarding notch 108, such an alignment mark can interfere with vacuum application during cutting or sizing of the thickness of polishing pad 100. Furthermore, both alignment marks 108 and 110 are formed after the fabrication of polishing pad 100 and, perhaps most importantly, after the formation of the groove pattern formed in the polishing surface 102 of polishing pad 100. As such, in the case of a pad fabricated in a molding process, there is no indication by alignment marks 108 or 110 of the orientation in a mold used for the molding process.

In an aspect of the present invention, a polishing pad is provided with a polishing surface including a plurality of circumferential grooves intersecting with a plurality of radial grooves, and an alignment feature disposed therein. In a first such example, FIG. 2 illustrates a top-down plan view of a polishing surface of a polishing pad, the polishing surface having a radial segment groove alignment feature disposed between two circumferential grooves, in accordance with an embodiment of the present invention.

Figure 2:
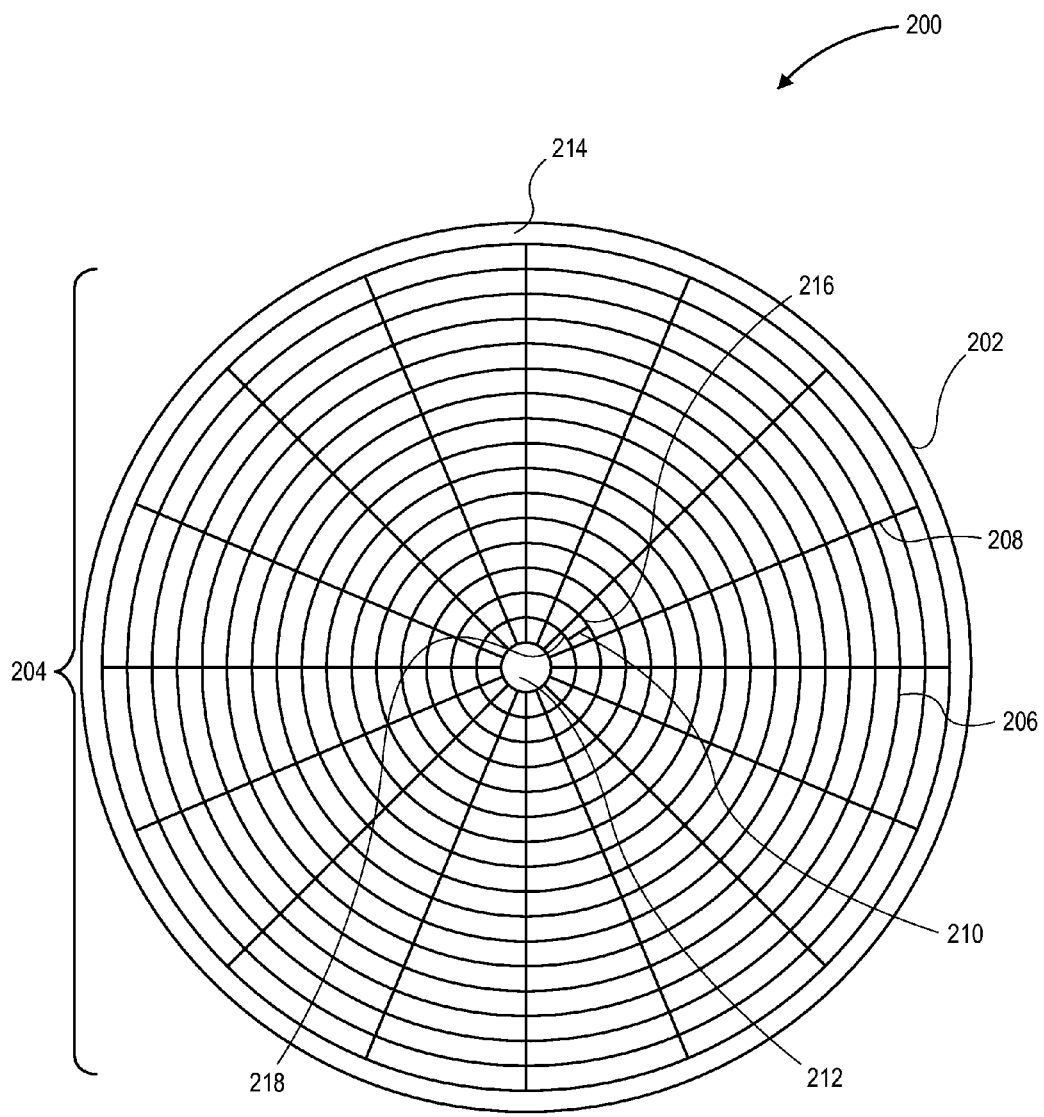
FIG. 2 illustrates a top-down plan view of a polishing surface of a polishing pad, the polishing surface having a radial segment groove alignment feature disposed between two circumferential grooves, in accordance with an embodiment of the present invention.

Referring to FIG. 2, a polishing pad 200 is provided for polishing a substrate. The polishing pad 200 includes a polishing body having a polishing surface 202 and a back surface (not shown). The polishing surface 202 has a pattern of grooves with a polishing region 204. The pattern of grooves includes a plurality of circumferential grooves 206 intersecting with a plurality of radial grooves 208. The polishing region 204 of the pattern of grooves includes an alignment feature 210. That is, polishing surface 202 includes an alignment feature 210 included in a region other than in a non-polishing region, e.g., other than in button 212 or outer-most region 214. In this first example, the alignment feature 210 is a radial segment groove disposed between two circumferential grooves 216 and 218, as depicted in FIG. 2.

It is to be understood that any suitable dimension or location for alignment feature 210 may be used. However, in one embodiment, alignment feature 210 is sized sufficiently large to be readily visible to the naked eye, but sufficiently small to not interfere with a polishing process since the alignment feature is included in a polishing region of the polishing pad 200. In a specific embodiment, the alignment feature 210 has a length-wise dimension approximately in the range of 1/8$^{th}$ of an inch to 1/4 of an inch. In an alternative embodiment, however, the radial segment is an entire additional radial groove.

Figure 3:
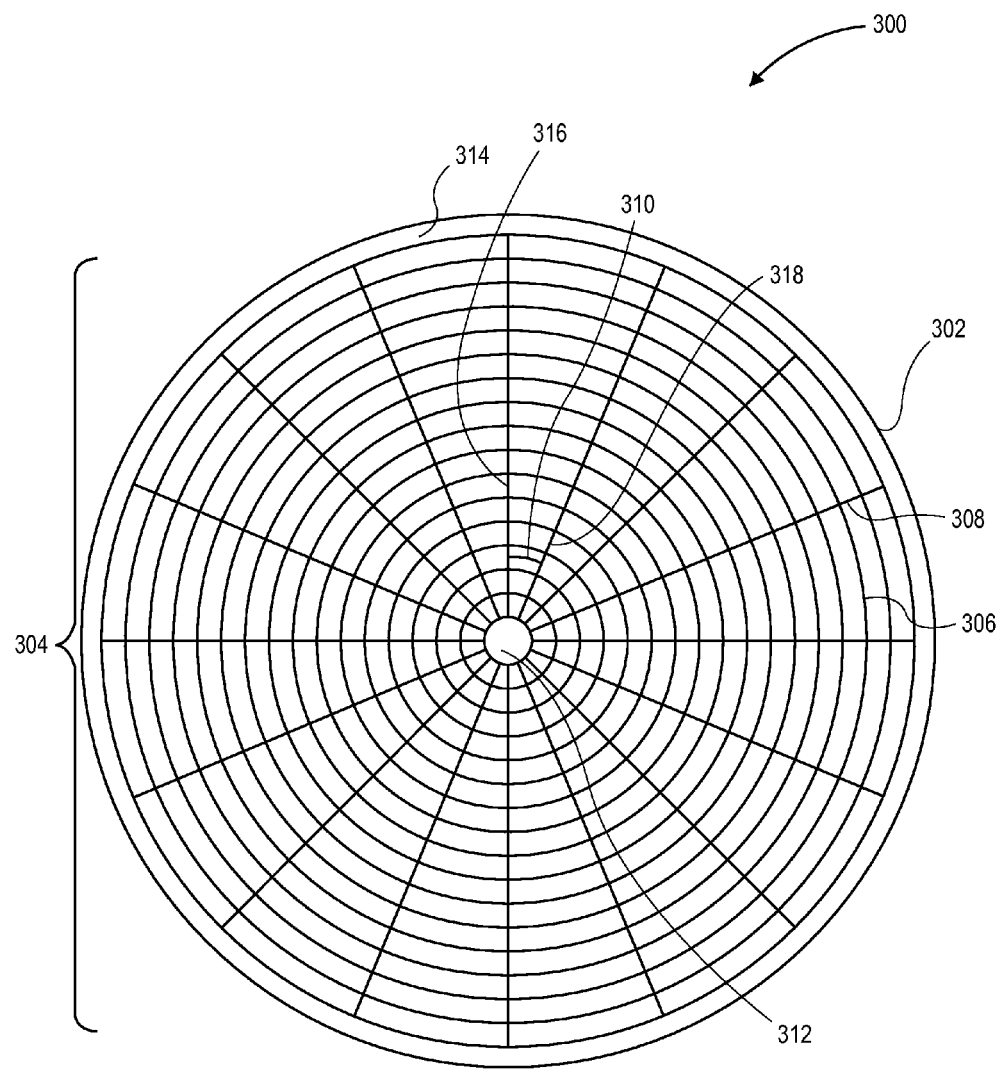
FIG. 3 illustrates a top-down plan view of a polishing surface of a polishing pad, the polishing surface having a circumferential segment groove alignment feature disposed between two radial grooves, in accordance with an embodiment of the present invention.

In a second such example, FIG. 3 illustrates a top-down plan view of a polishing surface of a polishing pad, the polishing surface having a circumferential segment groove alignment feature disposed between two radial grooves, in accordance with an embodiment of the present invention.

Referring to FIG. 3, a polishing pad 300 is provided for polishing a substrate. The polishing pad 300 includes a polishing body having a polishing surface 302 and a back surface (not shown). The polishing surface 302 has a pattern of grooves with a polishing region 304. The pattern of grooves includes a plurality of circumferential grooves 306 intersecting with a plurality of radial grooves 308. The polishing region 304 of the pattern of grooves includes an alignment feature 310. That is, polishing surface 302 includes an alignment feature 310 included in a region other than in a non-polishing region, e.g., other than in button 312 or outer-most region 314. In this second example, the alignment feature 310 is a circumferential segment groove disposed between two radial grooves 316 and 318, as depicted in FIG. 3.

It is to be understood that any suitable dimension or location for alignment feature 310 may be used. However, in one embodiment, alignment feature 310 is sized sufficiently large to be readily visible to the naked eye, but sufficiently small to not interfere with a polishing process since the alignment feature is included in a polishing region of the polishing pad 300. In a specific embodiment, the alignment feature 310 has a longest dimension approximately in the range of 1/8$^{th}$ of an inch to 1/4 of an inch.

Figure 4:
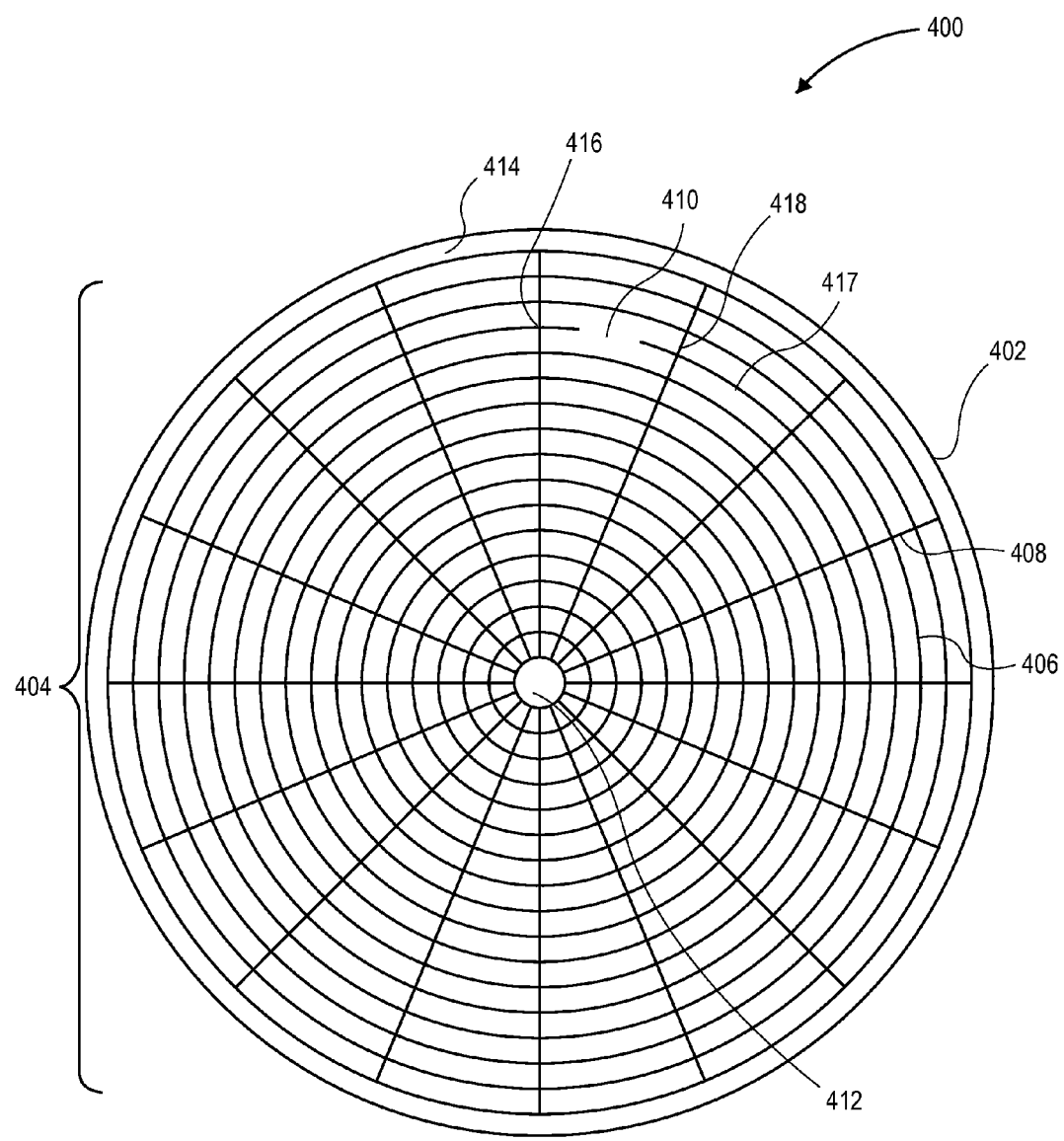
FIG. 4 illustrates a top-down plan view of a polishing surface of a polishing pad, the polishing surface having as an alignment feature an interruption in a circumferential groove, the interruption disposed between two radial grooves, in accordance with an embodiment of the present invention.

In a third such example, FIG. 4 illustrates a top-down plan view of a polishing surface of a polishing pad, the polishing surface having as an alignment feature an interruption in a circumferential groove, the interruption disposed between two radial grooves, in accordance with an embodiment of the present invention.

Referring to FIG. 4, a polishing pad 400 is provided for polishing a substrate. The polishing pad 400 includes a polishing body having a polishing surface 402 and a back surface (not shown). The polishing surface 402 has a pattern of grooves with a polishing region 404. The pattern of grooves includes a plurality of circumferential grooves 406 intersecting with a plurality of radial grooves 408. The polishing region 404 of the pattern of grooves includes an alignment feature 410. That is, polishing surface 402 includes an alignment feature 410 included in a region other than in a non-polishing region, e.g., other than in button 412 or outer-most region 414. In this third example, the alignment feature 410 is an interruption in one of the circumferential grooves 417, the interruption disposed between two radial grooves 416 and 418, as depicted in FIG. 4.

It is to be understood that any suitable dimension or location for alignment feature 410 may be used. However, in one embodiment, alignment feature 410 is sized sufficiently large to be readily visible to the naked eye, but sufficiently small to not interfere with a polishing process since the alignment feature is included in a polishing region of the polishing pad 400. In a specific embodiment, the alignment feature 410 has a longest dimension approximately in the range of 1/8$^{th}$ of an inch to 1/4 of an inch.

Figure 5:
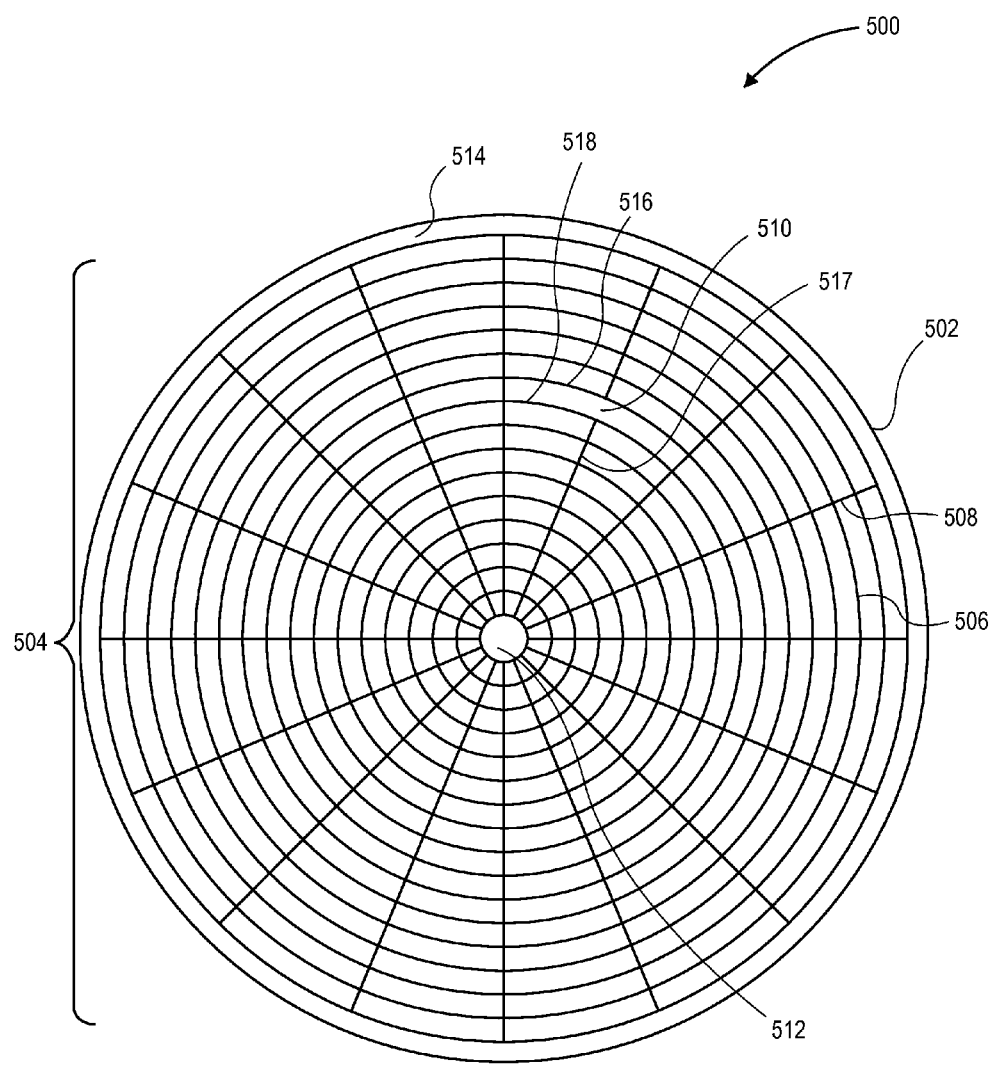
FIG. 5 illustrates a top-down plan view of a polishing surface of a polishing pad, the polishing surface having as an alignment feature an interruption in a radial groove, the interruption disposed between two circumferential grooves, in accordance with an embodiment of the present invention.

In a fourth such example, FIG. 5 illustrates a top-down plan view of a polishing surface of a polishing pad, the polishing surface having as an alignment feature an interruption in a radial groove, the interruption disposed between two circumferential grooves, in accordance with an embodiment of the present invention.

Referring to FIG. 5, a polishing pad 500 is provided for polishing a substrate. The polishing pad 500 includes a polishing body having a polishing surface 502 and a back surface (not shown). The polishing surface 502 has a pattern of grooves with a polishing region 504. The pattern of grooves includes a plurality of circumferential grooves 506 intersecting with a plurality of radial grooves 508. The polishing region 504 of the pattern of grooves includes an alignment feature 510. That is, polishing surface 502 includes an alignment feature 510 included in a region other than in a non-polishing region, e.g., other than in button 512 or outer-most region 514. In this fourth example, the alignment feature 510 is an interruption in one of the radial grooves 517, the interruption disposed between two circumferential grooves 516 and 518, as depicted in FIG. 5.

It is to be understood that any suitable dimension or location for alignment feature 510 may be used. However, in one embodiment, alignment feature 510 is sized sufficiently large to be readily visible to the naked eye, but sufficiently small to not interfere with a polishing process since the alignment feature is included in a polishing region of the polishing pad 500. In a specific embodiment, the alignment feature 510 has a length-wise dimension approximately in the range of 1/8$^{th}$ of an inch to 1/4 of an inch.

Figure 6:
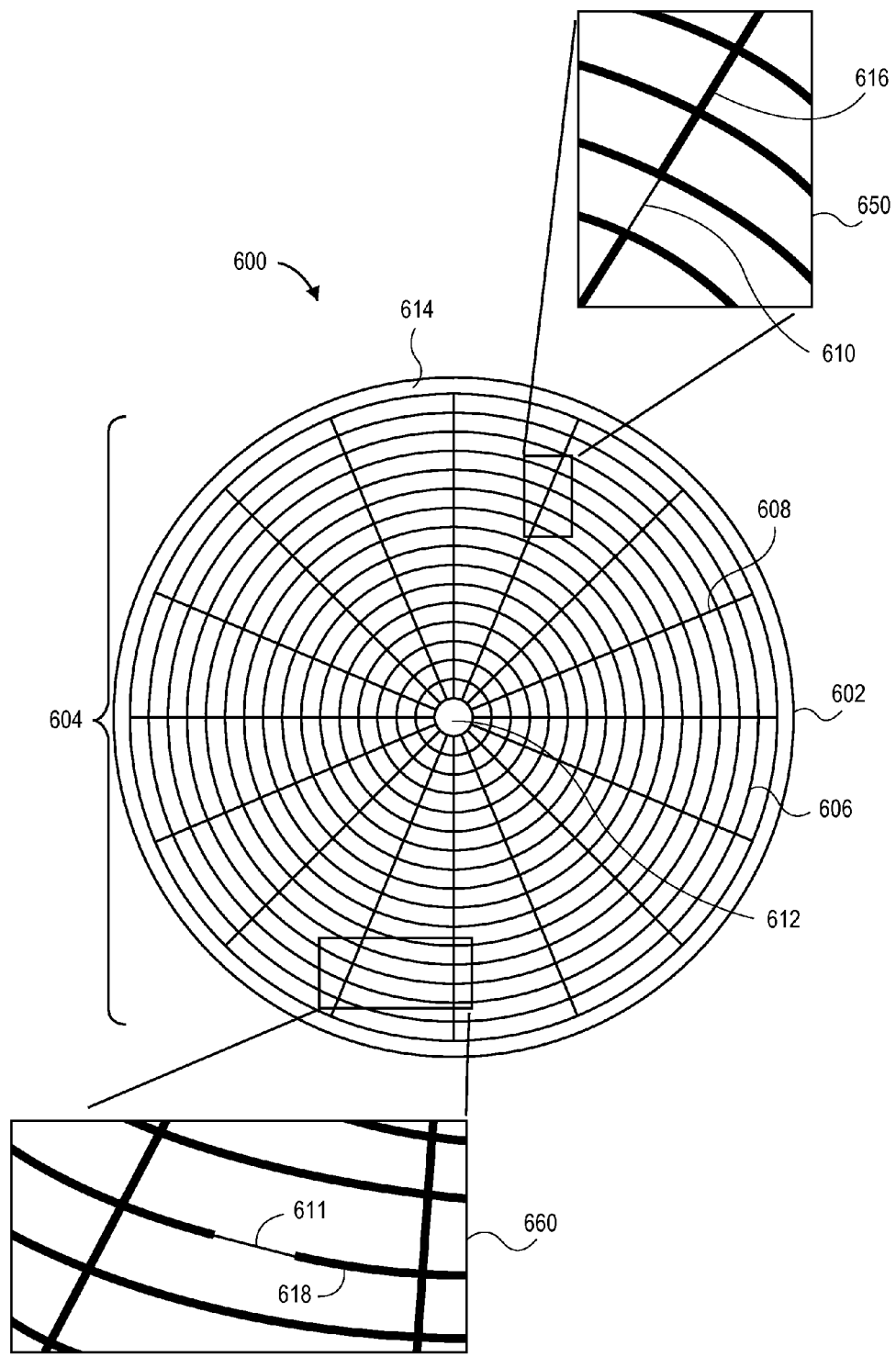
FIG. 6 illustrates a top-down plan view of a polishing surface of a polishing pad, the polishing surface having as an alignment feature a segment in a radial groove that is narrower than the remainder of the radial groove or a segment in a circumferential groove that is narrower than the remainder of the circumferential groove, in accordance with an embodiment of the present invention.

In a fifth such example, FIG. 6 illustrates a top-down plan view of a polishing surface of a polishing pad, the polishing surface having as an alignment feature a segment in a radial groove that is narrower than the remainder of the radial groove or a segment in a circumferential groove that is narrower than the remainder of the circumferential groove, in accordance with an embodiment of the present invention.

Referring to FIG. 6, a polishing pad 600 is provided for polishing a substrate. The polishing pad 600 includes a polishing body having a polishing surface 602 and a back surface (not shown). The polishing surface 602 has a pattern of grooves with a polishing region 604. The pattern of grooves includes a plurality of circumferential grooves 606 intersecting with a plurality of radial grooves 608. The polishing region 604 of the pattern of grooves includes a first alignment feature 610 and a second alignment feature 611. That is, polishing surface 602 includes alignment features 610 (as shown in expanded view portion 650) and 611 (as shown in expanded view portion 660) included in a region other than in a non-polishing region, e.g., other than in button 612 or outer-most region 614. In this fifth example, the alignment feature 610 is a segment in a radial groove 616 that is narrower than the remainder of the radial groove 616. Meanwhile, the alignment feature 611 is a segment in a circumferential groove 618 that is narrower than the remainder of the circumferential groove 618, as depicted in FIG. 6. It is to be understood that alignment features 610 and 611 are shown in the same polishing pad 600 for illustrative convenience and need not be included together in the same actual polishing pad.

It is to be understood that any suitable dimension or location for alignment features 610 or 611 may be used. However, in one embodiment, alignment feature 610 or 611 is sized sufficiently large to be readily visible to the naked eye, but sufficiently small to not interfere with a polishing process since the alignment feature is included in a polishing region of the polishing pad 600. In a specific embodiment, the segment is narrower than the remainder of the radial groove 616 or of the circumferential groove 618 by an amount approximately in the range of 15-50%. In an embodiment, although not shown, the junction of radial groove 616 and alignment feature 610 is tapered, as opposed to the abrupt junction depicted in FIG. 6. Likewise, the junction of circumferential groove 618 and alignment feature 611 may be tapered.

Figure 7:
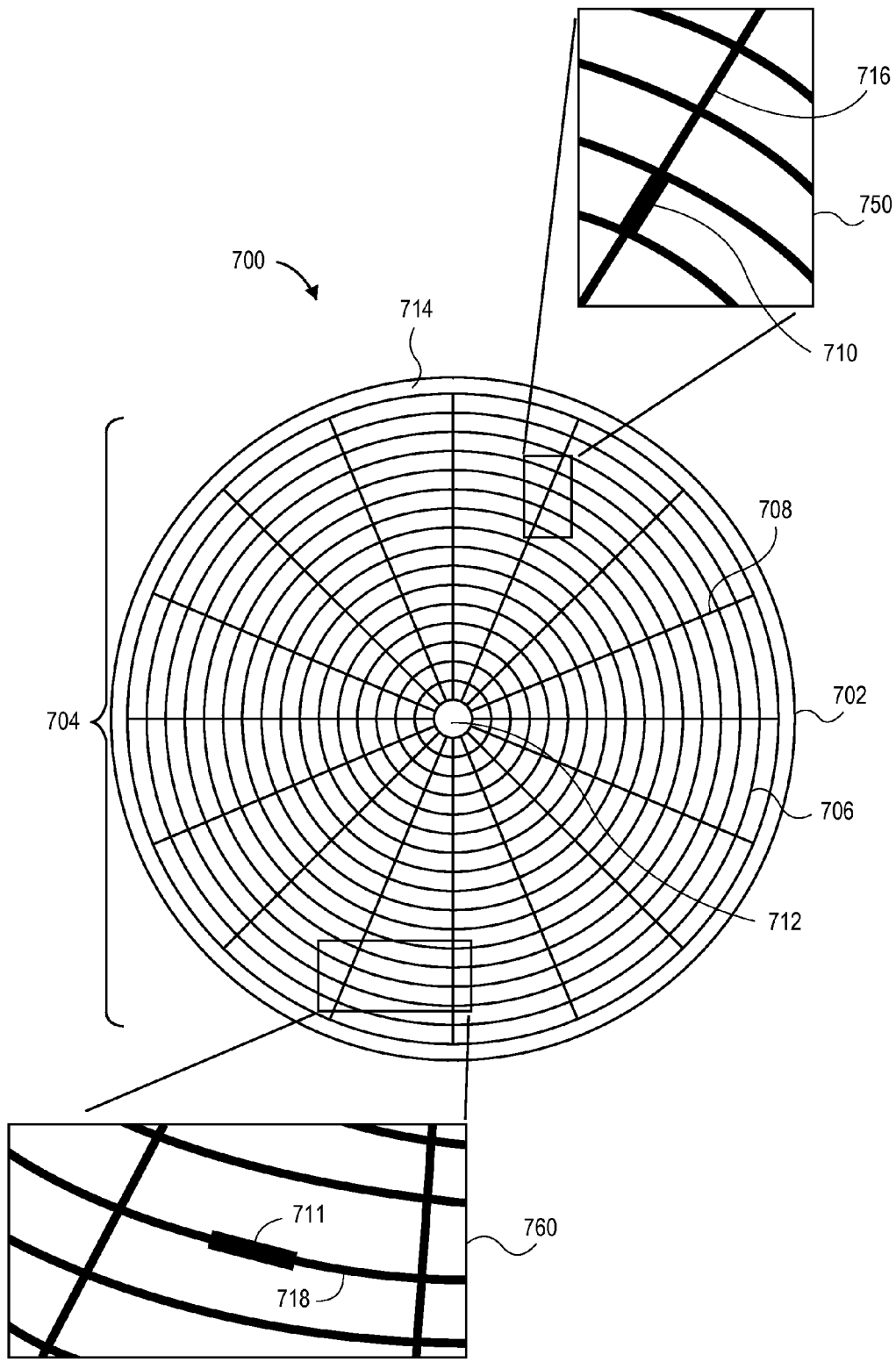
FIG. 7 illustrates a top-down plan view of a polishing surface of a polishing pad, the polishing surface having as an alignment feature a segment in a radial groove that is wider than the remainder of the radial groove or a segment in a circumferential groove that is wider than the remainder of the circumferential groove, in accordance with an embodiment of the present invention.

In a sixth such example, FIG. 7 illustrates a top-down plan view of a polishing surface of a polishing pad, the polishing surface having as an alignment feature a segment in a radial groove that is wider than the remainder of the radial groove or a segment in a circumferential groove that is wider than the remainder of the circumferential groove, in accordance with an embodiment of the present invention.

Referring to FIG. 7, a polishing pad 700 is provided for polishing a substrate. The polishing pad 700 includes a polishing body having a polishing surface 702 and a back surface (not shown). The polishing surface 702 has a pattern of grooves with a polishing region 704. The pattern of grooves includes a plurality of circumferential grooves 706 intersecting with a plurality of radial grooves 708. The polishing region 704 of the pattern of grooves includes a first alignment feature 710 and a second alignment feature 711. That is, polishing surface 702 includes alignment features 710 (as shown in expanded view portion 750) and 711 (as shown in expanded view portion 760) included in a region other than in a non-polishing region, e.g., other than in button 712 or outer-most region 714. In this sixth example, the alignment feature 710 is a segment in a radial groove 716 that is wider than the remainder of the radial groove 716. Meanwhile, the alignment feature 711 is a segment in a circumferential groove 718 that is wider than the remainder of the circumferential groove 718, as depicted in FIG. 7. It is to be understood that alignment features 710 and 711 are shown in the same polishing pad 700 for illustrative convenience and need not be included together in the same actual polishing pad. In an embodiment, although not shown, the junction of radial groove 716 and alignment feature 710 is tapered, as opposed to the abrupt junction depicted in FIG. 7. Likewise, the junction of circumferential groove 718 and alignment feature 711 may be tapered.

It is to be understood that any suitable dimension or location for alignment features 710 or 711 may be used. However, in one embodiment, alignment feature 710 or 711 is sized sufficiently large to be readily visible to the naked eye, but sufficiently small to not interfere with a polishing process since the alignment feature is included in a polishing region of the polishing pad 700. In a specific embodiment, the segment is wider than the remainder of the radial groove 716 or of the circumferential groove 718 by an amount approximately in the range of 15-50%.

Figure 8:
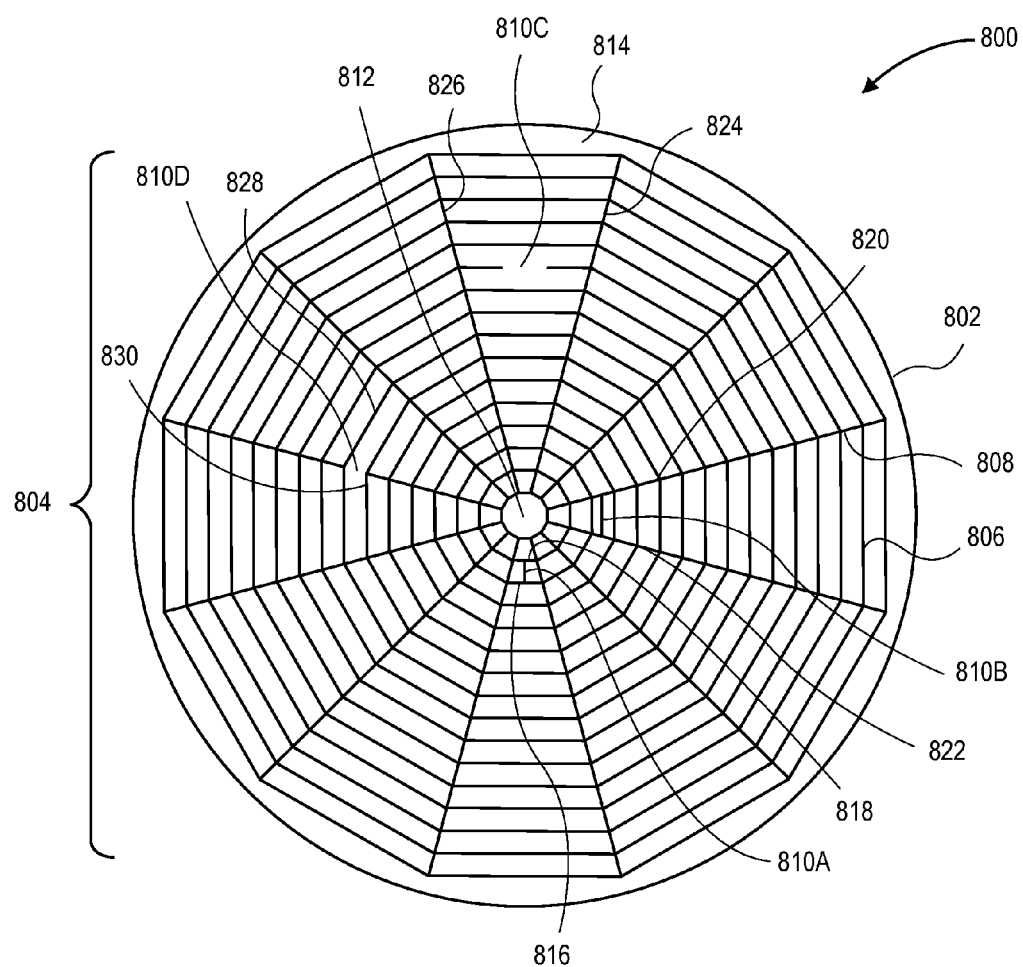
FIG. 8 illustrates a top-down plan view of a polishing surface of a polishing pad, the polishing surface having concentric polygons as circumferential grooves, and an alignment feature, in accordance with an embodiment of the present invention.

In a seventh such example, FIG. 8 illustrates a top-down plan view of a polishing surface of a polishing pad, the polishing surface having concentric polygons as circumferential grooves, and an alignment feature, in accordance with an embodiment of the present invention.

Referring to FIG. 8, a polishing pad 800 is provided for polishing a substrate. The polishing pad 800 includes a polishing body having a polishing surface 802 and a back surface (not shown). The polishing surface 802 has a pattern of grooves with a polishing region 804. The pattern of grooves includes a plurality of concentric polygon circumferential grooves 806 intersecting with a plurality of radial grooves 808. The polishing region 804 of the pattern of grooves includes one or more alignment features 810A, 810B, 810C, or 810D. That is, polishing surface 802 includes an alignment feature included in a region other than in a non-polishing region, e.g., other than in button 812 or outer-most region 814. In this seventh example, the alignment feature is one such as, but not limited to, a radial segment groove 810A disposed between two concentric polygon circumferential grooves 816 and 818, a circumferential segment groove (linear or tangential, in this case) 810B disposed between two radial grooves 820 and 822, an interruption 810C in one of the concentric polygon circumferential grooves, the interruption 810C disposed between two radial grooves 824 and 826, or an interruption 810D in one of the radial grooves, the interruption 810D disposed between two concentric polygon circumferential grooves 828 and 830.

It is to be understood that any suitable dimension or location for alignment feature 810A, 810B, 810C, or 810D may be used. However, in one embodiment, alignment feature 810A, 810B, 810C, or 810D is sized sufficiently large to be readily visible to the naked eye, but sufficiently small to not interfere with a polishing process since the alignment feature is included in a polishing region of the polishing pad 800. In a specific embodiment, alignment feature 810A, 810B, 810C, or 810D has a length-wise dimension approximately in the range of $1/8^{th}$ of an inch to $1/4$ of an inch. In an alternative embodiment, however, the radial segment alignment feature 810A is an entire additional radial groove. It is to be understood that other embodiments contemplated include wider or narrower groove portions or segments, as described in association with FIGS. 6 and 7.

Basic examples of possible embodiments contemplated for groove patterns having concentric polygons as circumferential grooves, such as described in association with FIG. 8, include groove patterns based on a series of grooves that form similar polygons, all with the same center point, and all aligned with an angle theta of zero so that their straight line segments are parallel and their angles are aligned in a radial fashion. Nested triangles, squares, pentagons, hexagons, etc., are all considered within the spirit and scope of the present invention. There may be a maximum number of straight line segments above which the polygons will become approximately circular. Preferred embodiments may include limiting the groove pattern to polygons with a number of sides less than such a number of straight line segments. One reason for this approach may be to improve averaging of the polish benefit, which might otherwise be diminished as the number of sides of each polygon increases and approaches a circular shape. Another embodiment includes groove patterns with concentric polygons having a center that is not in the same location as the polishing pad center.

In another aspect of the present invention, a polishing pad is provided with a polishing surface including a plurality of circumferential grooves but no intersecting radial grooves, and an alignment feature disposed therein. In one such example, FIG. 9 illustrates a top-down plan view of a polishing surface of a polishing pad, the polishing surface having a radial segment groove alignment feature disposed between two circumferential grooves, a circumferential segment groove alignment feature disposed between two circumferential grooves, or an interruption in a circumferential groove, in accordance with an embodiment of the present invention.

Figure 9:
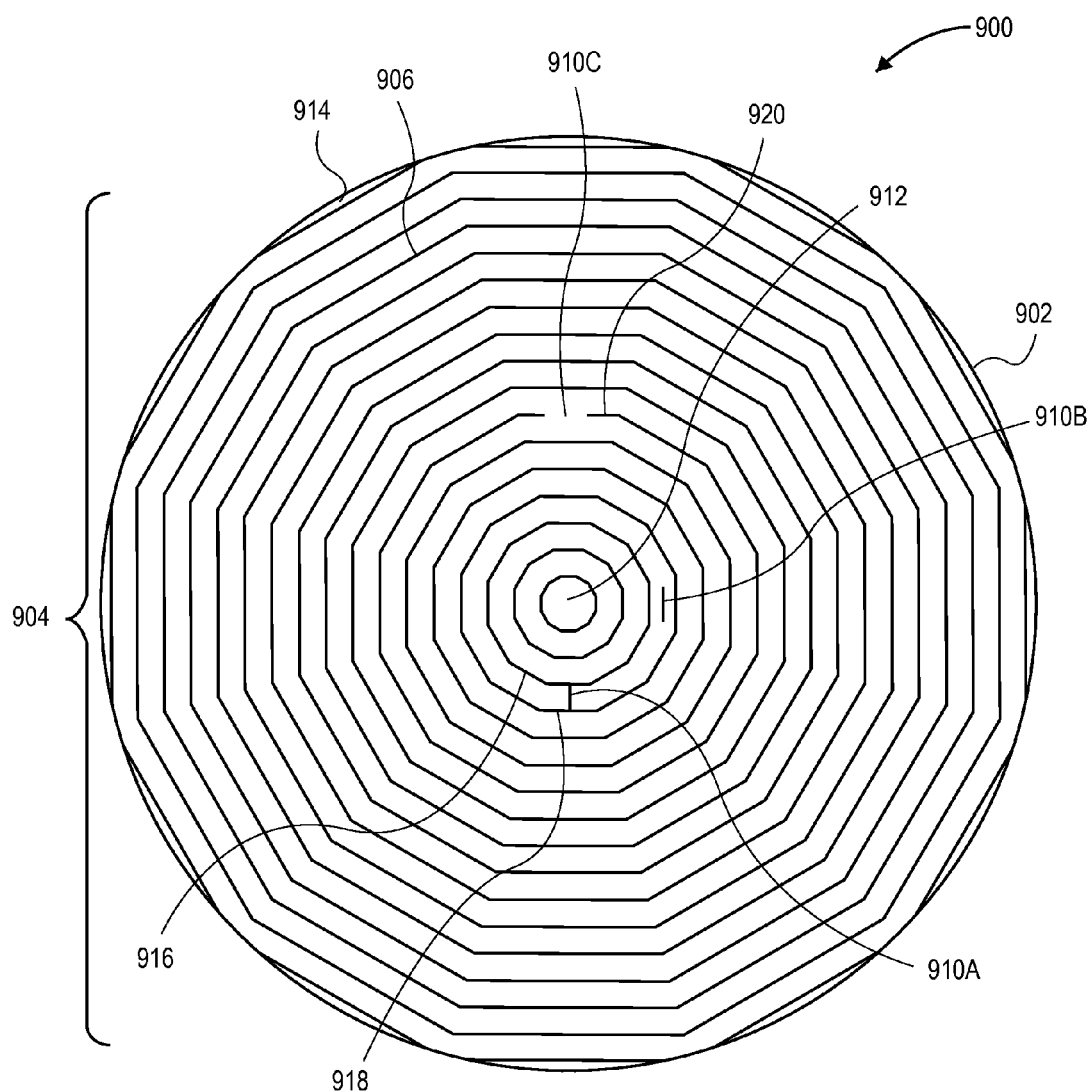
FIG. 9 illustrates a top-down plan view of a polishing surface of a polishing pad, the polishing surface having a radial segment groove alignment feature disposed between two circumferential grooves, a circumferential segment groove alignment feature disposed between two circumferential grooves, or an interruption in a circumferential groove, in accordance with an embodiment of the present invention.

Referring to FIG. 9, a polishing pad 900 is provided for polishing a substrate. The polishing pad 900 includes a polishing body having a polishing surface 902 and a back surface (not shown). The polishing surface 902 has a pattern of grooves with a polishing region 904. The pattern of grooves includes a plurality of concentric polygon circumferential grooves 906. The polishing region 904 of the pattern of grooves includes one or more alignment features 910A, 910B, or 910C. That is, polishing surface 902 includes an alignment feature included in a region other than in a non-polishing region, e.g., other than in button 912 or outer-most region 914. In this eighth example, the alignment feature is one such as, but not limited to, a radial segment groove 910A disposed between two circumferential grooves 916 and 918, a circumferential segment groove (linear or tangential, in this case) 910B disposed between two circumferential grooves 916 and 918, or an interruption 910C in one of the circumferential grooves 920. Thus, in contrast to the polishing pads of FIGS. 2-8, the pattern of grooves for polishing pad 900 has no repeating radial groove pattern portion. Such an embodiment aid in retention of slurry on the polishing surface of the polishing pad 900.

It is to be understood that any suitable dimension or location for alignment feature 910A, 910B, or 910C may be used. However, in one embodiment, alignment feature 910A, 910B, or 910C is sized sufficiently large to be readily visible to the naked eye, but sufficiently small to not interfere with a polishing process since the alignment feature is included in a polishing region of the polishing pad 900. In a specific embodiment, alignment feature 910A, 910B, or 910C has a length-wise dimension approximately in the range of $1/8^{th}$ of an inch to $1/4$ of an inch. In an alternative embodiment, however, the radial segment alignment feature 910A is an entire single radial groove. It is to be understood that other embodiments contemplated include wider or narrower groove portions or segments, as described in association with FIGS. 6 and 7. It is also to be understood that a groove pattern that excludes a repeating radial groove portion may be fabricated to have circular circumferential grooves instead of the concentric polygon circumferential groove pattern shown in FIG. 9.

As described in numerous embodiments above, an alignment feature may be a groove segment or may be included in a portion of a groove that makes up a more general groove pattern. In accordance with an embodiment of the present invention, such a groove segment or portion of a groove is adapted to remain throughout the polishing lifetime of the polishing pad in which it is included. That is, the alignment feature may provide information regarding the manufacture of the polishing pad, or may be useful for aligning the polishing pad on a platen, for essentially all runs for which the polishing pad is used. In an embodiment, the alignment feature is a groove segment or portion of a groove having a depth of approximately 80% or greater of the depth of the grooves of the general pattern of grooves of the polishing pad. In one such embodiment, the alignment feature is a groove segment or portion of a groove having a depth at least the depth of the grooves of the general pattern of grooves.

In an embodiment, polishing pads described herein, such as polishing pads 200, 300, 400, 500, 600, 700, 800, 900 or 1000, are suitable for polishing substrates. The substrate may be one used in the semiconductor manufacturing industry, such as a silicon substrate having device or other layers disposed thereon. However, the substrate may be one such as, but not limited to, a substrates for MEMS devices, reticles, or solar modules. Thus, reference to "a polishing pad for polishing a substrate," as used herein, is intended to encompass these and related possibilities.

Also, polishing pads described herein, such as polishing pads 200, 300, 400, 500, 600, 700, 800, 900 or 1000, may be composed of a homogeneous polishing body of a thermoset polyurethane material. In an embodiment, the homogeneous polishing body is composed of a thermoset, closed cell polyurethane material. In an embodiment, the term "homogeneous" is used to indicate that the composition of a thermoset, closed cell polyurethane material is consistent throughout the entire composition of the polishing body. For example, in an embodiment, the term "homogeneous" excludes polishing pads composed of, e.g., impregnated felt or a composition (composite) of multiple layers of differing material. In an embodiment, the term "thermoset" is used to indicate a polymer material that irreversibly cures, e.g., the precursor to the material changes irreversibly into an infusible, insoluble polymer network by curing. For example, in an embodiment, the term "thermoset" excludes polishing pads composed of, e.g., "thermoplast" materials or "thermoplastics"—those materials composed of a polymer that turns to a liquid when heated and returns to a very glassy state when cooled sufficiently. It is noted that polishing pads made from thermoset materials are typically fabricated from lower molecular weight precursors reacting to form a polymer in a chemical reaction, while pads made from thermoplastic materials are typically fabricated by heating a pre-existing polymer to cause a phase change so that a polishing pad is formed in a physical process. Polyurethane thermoset polymers may be selected for fabricating polishing pads described herein based on their stable thermal and mechanical properties, resistance to the chemical environment, and tendency for wear resistance.

In an embodiment, polishing pads described herein, such as polishing pads 200, 300, 400, 500, 600, 700, 800, 900 or 1000, include a molded homogeneous polishing body. The term "molded" is used to indicate that a homogeneous polishing body is formed in a formation mold, as described in more detail below in association with FIGS. 11A-11F. In an embodiment, the homogeneous polishing body, upon conditioning and/or polishing, has a polishing surface roughness approximately in the range of 1-5 microns root mean square. In one embodiment, the homogeneous polishing body, upon conditioning and/or polishing, has a polishing surface roughness of approximately 2.35 microns root mean square. In an embodiment, the homogeneous polishing body has a storage modulus at 25 degrees Celsius approximately in the range of 30-120 megaPascals (MPa). In another embodiment, the homogeneous polishing body has a storage modulus at 25 degrees Celsius approximately less than 30 megaPascals (MPa). In an embodiment, as described in association with FIGS. 11A-11F, a polishing pad is composed of a molded polishing body, and an alignment feature included in a polishing region thereof indicates a location of a region in a mold used for forming the molded polishing body. That is, the alignment feature provides information of the actual manufacturing process of the polishing pad.

In an embodiment, polishing pads described herein, polishing pads 200, 300, 400, 500, 600, 700, 800, 900 or 1000, include a polishing body having a plurality of closed cell pores therein. In one embodiment, the plurality of closed cell pores is a plurality of porogens. For example, the term "porogen" may be used to indicate micro- or nano-scale spherical or somewhat spherical particles with "hollow" centers. The hollow centers are not filled with solid material, but may rather include a gaseous or liquid core. In one embodiment, the plurality of closed cell pores is composed of pre-expanded and gas-filled EXPANCEL™ distributed throughout (e.g., as an additional component in) a homogeneous polishing body of the polishing pad. In a specific embodiment, the EXPANCEL™ is filled with pentane. In an embodiment, each of the plurality of closed cell pores has a diameter approximately in the range of 10-100 microns. In an embodiment, the plurality of closed cell pores includes pores that are discrete from one another. This is in contrast to open cell pores which may be connected to one another through tunnels, such as the case for the pores in a common sponge. In one embodiment, each of the closed cell pores includes a physical shell, such as a shell of a porogen, as described above. In another embodiment, however, each of the closed cell pores does not include a physical shell. In an embodiment, the plurality of closed cell pores is distributed essentially evenly throughout a thermoset polyurethane material of a homogeneous polishing body.

In an embodiment, the homogeneous polishing body is opaque. In one embodiment, the term "opaque" is used to indicate a material that allows approximately 10% or less visible light to pass. In one embodiment, the homogeneous polishing body is opaque in most part, or due entirely to, the inclusion of an opacifying lubricant throughout (e.g., as an additional component in) the homogeneous thermoset, closed cell polyurethane material of the homogeneous polishing body. In a specific embodiment, the opacifying lubricant is a material such as, but not limited to: boron nitride, cerium fluoride, graphite, graphite fluoride, molybdenum sulfide, niobium sulfide, talc, tantalum sulfide, tungsten disulfide, or Teflon.

The sizing of the homogeneous polishing body may be varied according to application. Nonetheless, certain parameters may be used to make polishing pads including such a homogeneous polishing body compatible with conventional processing equipment or even with conventional chemical mechanical processing operations. For example, in accordance with an embodiment of the present invention, the homogeneous polishing body has a thickness approximately in the range of 0.075 inches to 0.130 inches, e.g., approximately in the range of 1.9-3.3 millimeters. In one embodiment, the homogeneous polishing body has a diameter approximately in the range of 20 inches to 30.3 inches, e.g., approximately in the range of 50-77 centimeters, and possibly approximately in the range of 10 inches to 42 inches, e.g., approximately in the range of 25-107 centimeters. In one embodiment, the homogeneous polishing body has a pore density approximately in the range of 6%-36% total void volume, and possibly approximately in the range of 15%-35% total void volume. In one embodiment, the homogeneous polishing has a porosity of the closed cell type, as described above, due to inclusion of a plurality of pores. In one embodiment, the homogeneous polishing body has a compressibility of approximately 2.5%. In one embodiment, the homogeneous polishing body has a density approximately in the range of 0.70-1.05 grams per cubic centimeter.

In another embodiment, a polishing pad having a polishing surface with an alignment feature further includes a detection region for use with, e.g., an eddy current detection system. For example, FIGS. 10A and 10B illustrate a top-down plan view and a cross-sectional view, respectively, of a polishing pad with a polishing surface having an alignment feature and a back surface having a detection region, in accordance with an embodiment of the present invention.

Figure 10A:
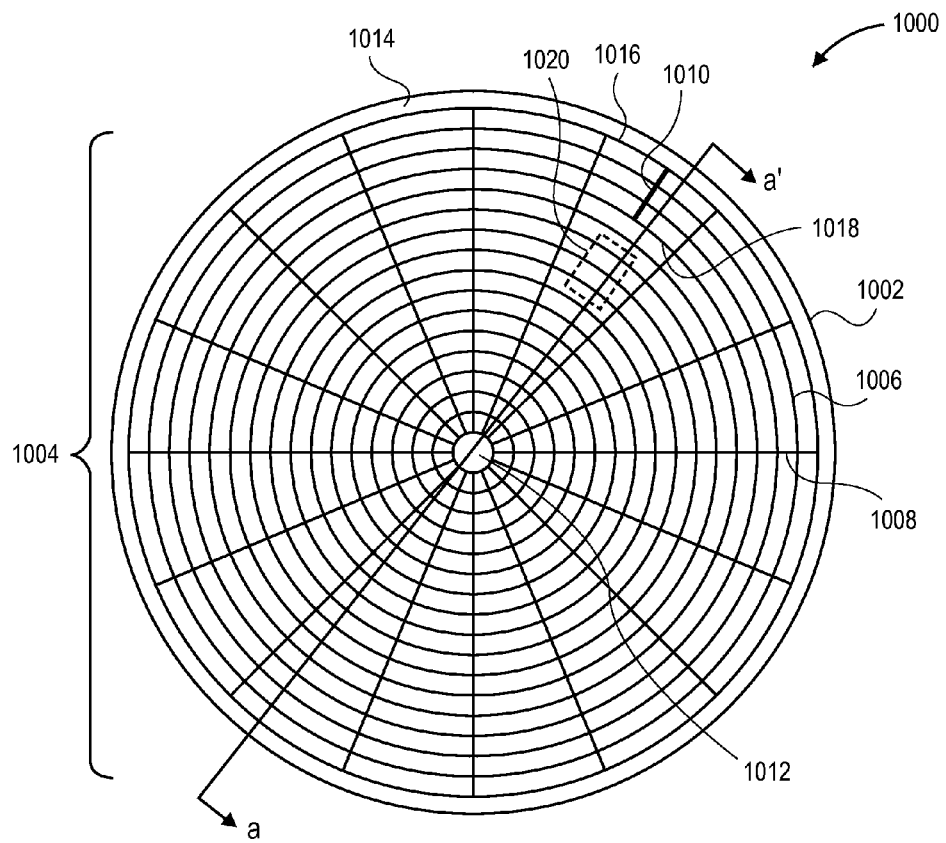
FIG. 10A illustrates a top-down plan view of a polishing surface of a polishing pad, the polishing surface having an alignment feature and a back surface detection region, in accordance with an embodiment of the present invention.

Referring to FIG. 10A, a polishing pad 1000 is provided for polishing a substrate. The polishing pad 1000 includes a polishing body having a polishing surface 1002. The polishing surface 1002 has a pattern of grooves with a polishing region 1004. The pattern of grooves includes a plurality of circumferential grooves 1006 intersecting with a plurality of radial grooves 1008. The polishing region 1004 of the pattern of grooves includes an alignment feature 1010. That is, polishing surface 1002 includes an alignment feature 1010 included in a region other than in a non-polishing region, e.g., other than in button 1012 or outer-most region 1014. In an embodiment, the alignment feature 1010 is a radial segment groove disposed between two circumferential grooves 1016 and 1018, as depicted in FIG. 10. Although not depicted in FIG. 10A, polishing pad 1000 also has a back surface. The back surface may have disposed therein a detection region 1020, depicted by dashed lines in FIG. 10A since the detection region 1020 would otherwise not be visible from the view presented in FIG. 10A.

Figure 10B:
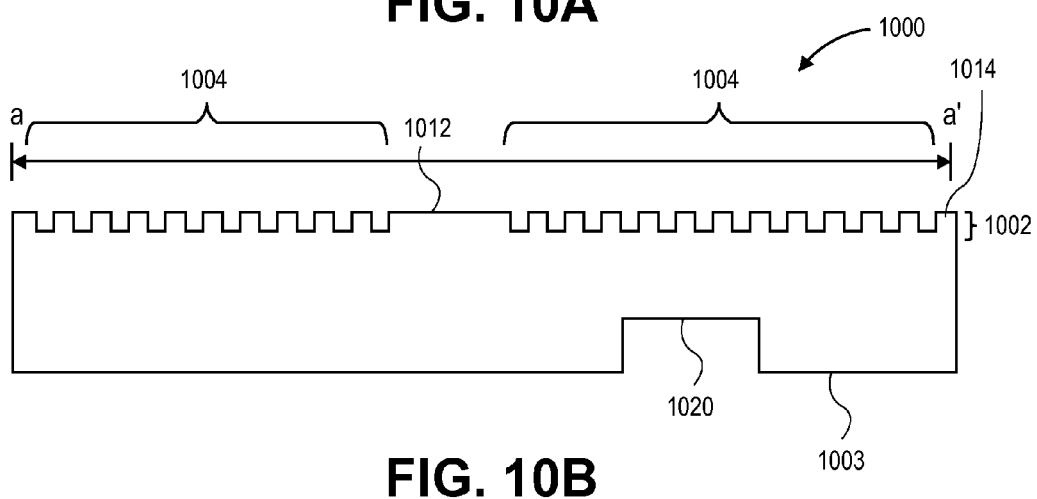
FIG. 10B illustrates a cross-sectional view of a polishing pad with a polishing surface having an alignment feature and a back surface having a detection region, in accordance with an embodiment of the present invention.

Referring to FIG. 10B, a cross-section of polishing pad 1000 taken along the a-a' axis of FIG. 10A is shown. From the viewpoint of FIG. 10B, the polishing surface 1002, a back surface 1003, the polishing region 1004, the button 1012, the outer-most region 1014, and the detection region 1020 can be seen. In an embodiment, the alignment feature 1010 is not visible from the view presented in FIG. 10B. However, in such an embodiment, when the polishing pad 1000 is viewed from the perspective shown in FIG. 10A, e.g., when the polishing pad 1000 is disposed on a platen of a CMP process tool, the alignment feature 1010 provides information as to the location of the detection region 1020 which is not visible from the view presented in FIG. 10A.

Thus, in accordance with an embodiment of the present invention, the alignment feature 1010 indicates a location of a detection region 1020 disposed in the back surface 1003 of the polishing pad 1000. In one embodiment, a pattern of grooves on the polishing surface of polishing pad 1000 includes a plurality of circumferential grooves intersecting with a plurality of radial grooves, and the alignment feature 1010 is aligned with one or more of the radial grooves as well as the location of the detection region 1020, as depicted in FIG. 10A. In one embodiment, the alignment feature 1010 is positioned for alignment with a feature on a platen of a chemical mechanical polishing apparatus, as described in more detain below in association with FIG. 12. As such, alignment feature 1010 may be useful where no other marks would otherwise indicate the back-side location of a detection regions, or if it is undesirable to otherwise mark in the region of the polishing surface directly over the detection region. In a specific embodiment, detection region 1020 is suitable for accommodating an eddy current measurement device. Examples of suitable eddy current detection regions are described in U.S. patent application Ser. No. 12/895,465 filed on Sep. 30, 2010, assigned to NexPlanar Corporation.

In another embodiment of the present invention, a polishing pad having an alignment feature further includes a local area transparency (LAT) region disposed in the polishing pad. For example, a groove pattern may be interrupted by a local area transparency (LAT) region, disposed in the polishing surface of a polishing pad. In an embodiment, the LAT region is disposed in, and covalently bonded with, a homogeneous polishing body of the polishing pad. Examples of suitable LAT regions are described in U.S. patent application Ser. No. 12/895,465 filed on Sep. 30, 2010, assigned to NexPlanar Corporation.

In another aspect of the present invention, polishing pads having polishing surfaces with alignment features may be fabricated in a molding process. For example, FIGS. 11A-11F illustrate cross-sectional views of operations used in the fabrication of a polishing pad, in accordance with an embodiment of the present invention.

Figure 11A:
FIGS. 11A-11F illustrate cross-sectional views of operations used in the fabrication of a polishing pad, in accordance with an embodiment of the present invention.
Figure 11B:
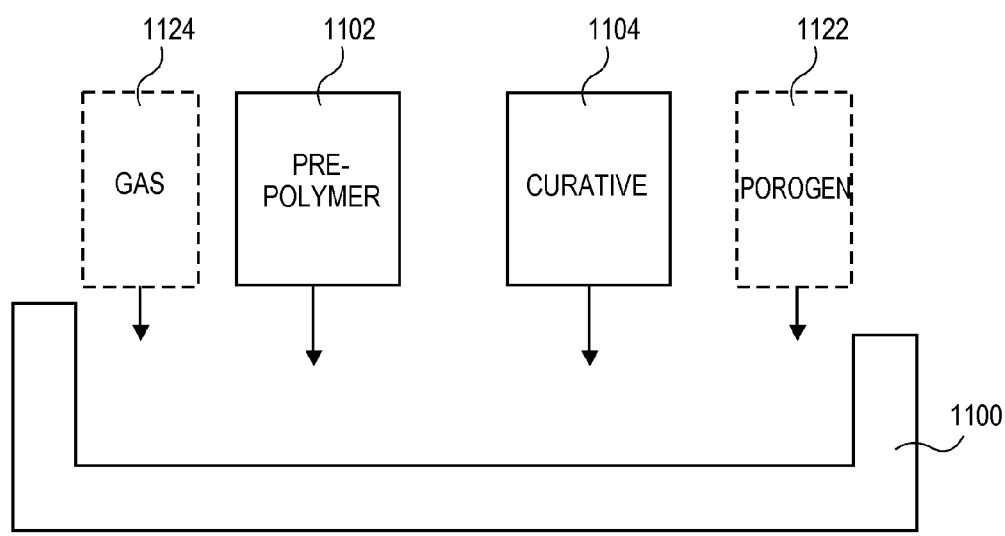
Figure 11C:
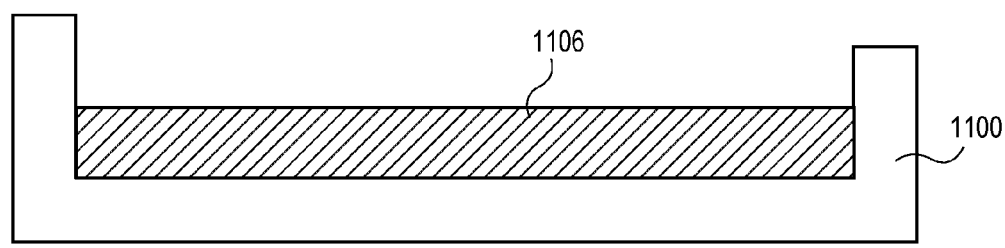

Referring to FIG. 11A, a formation mold 1100 is provided. Referring to FIG. 11B, a pre-polymer 1102 and a curative 1104 are mixed to form a mixture 1106 in the formation mold 1100, as depicted in FIG. 11C. In an embodiment, mixing the pre-polymer 1102 and the curative 1104 includes mixing an isocyanate and an aromatic diamine compound, respectively. In one embodiment, the mixing further includes adding an opacifying lubricant to the pre-polymer 1102 and the curative 1104 to ultimately provide an opaque molded homogeneous polishing body. In a specific embodiment, the opacifying lubricant is a material such as, but not limited to: boron nitride, cerium fluoride, graphite, graphite fluoride, molybdenum sulfide, niobium sulfide, talc, tantalum sulfide, tungsten disulfide, or Teflon.

In an embodiment, the polishing pad precursor mixture 1106 is used to ultimately form a molded homogeneous polishing body composed of a thermoset, closed cell polyurethane material. In one embodiment, the polishing pad precursor mixture 1106 is used to ultimately form a hard pad and only a single type of curative is used. In another embodiment, the polishing pad precursor mixture 1106 is used to ultimately form a soft pad and a combination of a primary and a secondary curative is used. For example, in a specific embodiment, the pre-polymer includes a polyurethane precursor, the primary curative includes an aromatic diamine compound, and the secondary curative includes a compound having an ether linkage. In a particular embodiment, the polyurethane precursor is an isocyanate, the primary curative is an aromatic diamine, and the secondary curative is a curative such as, but not limited to, polytetramethylene glycol, amino-functionalized glycol, or amino-functionalized polyoxypropylene. In an embodiment, the pre-polymer, a primary curative, and a secondary curative have an approximate molar ratio of 100 parts pre-polymer, 85 parts primary curative, and 15 parts secondary curative. It is to be understood that variations of the ratio may be used to provide polishing pads with varying hardness values, or based on the specific nature of the pre-polymer and the first and second curatives.

Figure 11D:
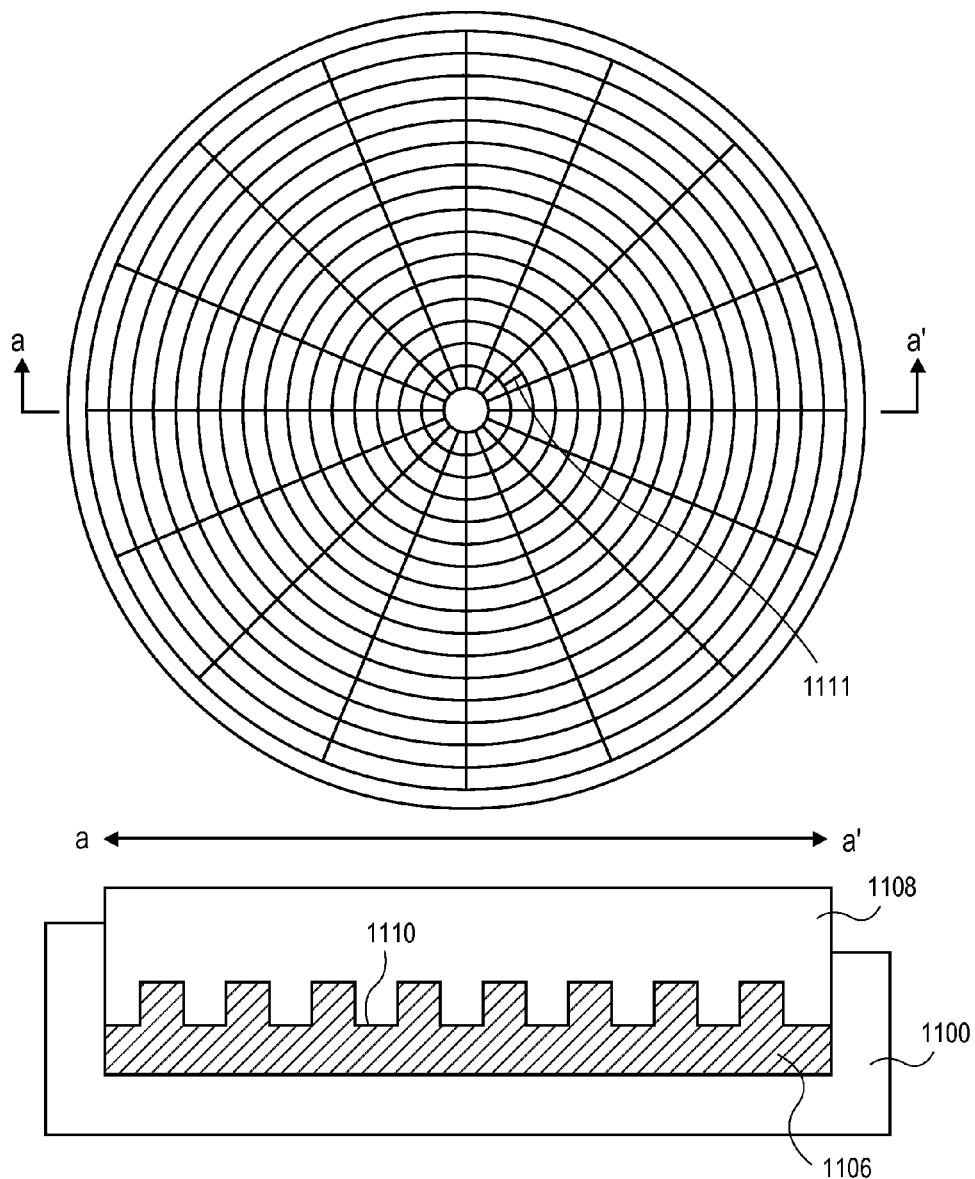

Referring to FIG. 11D, a lid 1108 of the formation mold 1100 is lowered into the mixture 1106. A top-down plan view of lid 1108 is shown on top, while a cross-section along the a-a' axis is shown below in FIG. 11D. In an embodiment, the lid 1108 has disposed thereon a pattern of protrusions 1110 and an alignment forming feature 1111. The pattern of protrusions 1110 is used to stamp a pattern of grooves into a polishing surface of a polishing pad formed in formation mold 1100.

In an embodiment, alignment forming feature 1111 is also a protrusion. For example, in one embodiment, the alignment forming feature 1111 is an alignment protrusion having a height of approximately 80% or greater of the height of the protrusions of the pattern of protrusions 1110. In a specific embodiment, the alignment protrusion 1111 has a height at least the height of the protrusions of the pattern of protrusions 1110.

It is to be understood that embodiments described herein that describe lowering the lid 1108 of a formation mold 1100 need only achieve a bringing together of the lid 1108 and a base of the formation mold 1100. That is, in some embodiments, a base of a formation mold 1100 is raised toward a lid 1108 of a formation mold, while in other embodiments a lid 1108 of a formation mold 1100 is lowered toward a base of the formation mold 1100 at the same time as the base is raised toward the lid 1108.

Figure 11E:
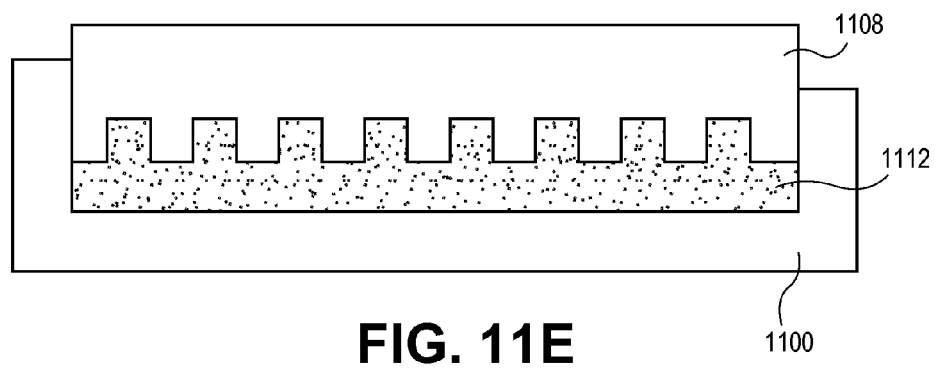

Referring to FIG. 11E, the mixture 1106 is cured to provide a molded homogeneous polishing body 1112 in the formation mold 1100. The mixture 1106 is heated under pressure (e.g., with the lid 1108 in place) to provide the molded homogeneous polishing body 1112. In an embodiment, heating in the formation mold 1100 includes at least partially curing in the presence of lid 1108, which encloses mixture 1106 in formation mold 1100, at a temperature approximately in the range of 200-260 degrees Fahrenheit and a pressure approximately in the range of 2-12 pounds per square inch.

Figure 11F:
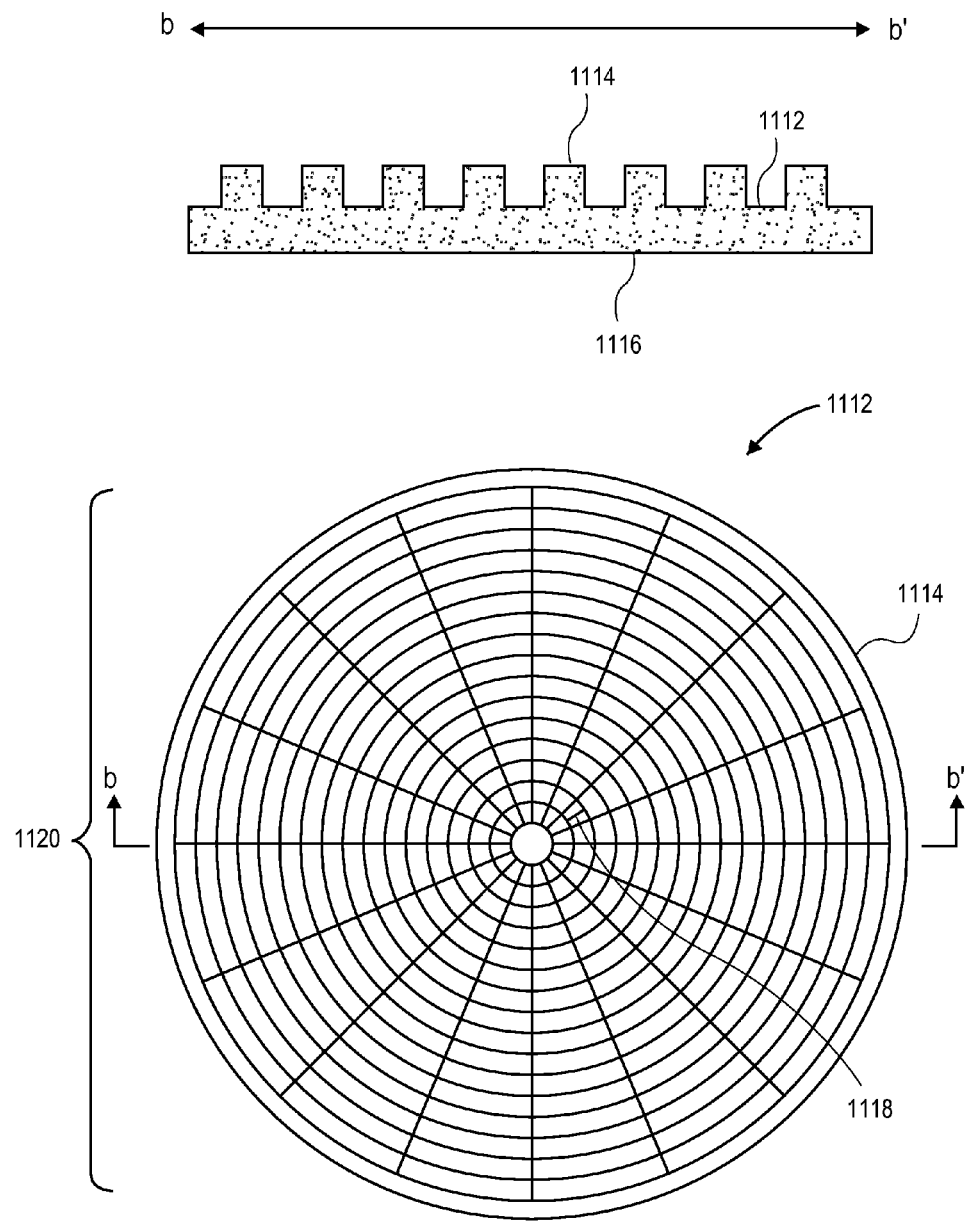

Referring to FIG. 11F, a polishing pad (or polishing pad precursor, if further curing is required) is separated from lid 1108 and removed from formation mold 1100 to provide the discrete molded homogeneous polishing body 1112. A top-down plan view of molded homogeneous polishing body 1112 is shown below, while a cross-section along the b-b' axis is shown above in FIG. 11F. It is noted that further curing through heating may be desirable and may be performed by placing the polishing pad in an oven and heating. Thus, in one embodiment, curing the mixture 1106 includes first partially curing in the formation mold 1100 and then further curing in an oven. Either way, a polishing pad is ultimately provided, wherein a molded homogeneous polishing body 1112 of the polishing pad has a polishing surface 1114 and a back surface 1116. In an embodiment, the molded homogeneous polishing body 1112 is composed of a thermoset polyurethane material and a plurality of closed cell pores disposed in the thermoset polyurethane material.

The molded homogeneous polishing body 1112 includes a polishing surface 1114 having disposed therein a pattern of grooves 1120 corresponding to the pattern of protrusions 1110 of the lid 1108. The pattern of grooves 1120 may be a pattern of grooves as described above, e.g., with respect to FIGS. 2-10. Additionally, the molded homogeneous polishing body 1112 includes in its polishing surface 1114 an alignment feature 1118, corresponding to the alignment forming feature 1111 of the lid 1108. In an embodiment, the alignment feature 1118 is also a groove or groove segment. For example, in one embodiment, the alignment feature 1118 is a groove segment having a depth of approximately 80% or greater of the depth of the grooves of the pattern of protrusions 1120. In a specific embodiment, such a groove segment has a depth at least the depth of the grooves of the pattern of grooves 1120.

In an embodiment, referring again to FIG. 11B, the mixing further includes adding a plurality of porogens 1122 to the pre-polymer 1102 and the curative 1104 to provide closed cell pores in the ultimately formed polishing pad. Thus, in one embodiment, each closed cell pore has a physical shell. In another embodiment, referring again to FIG. 11B, the mixing further includes injecting a gas 1124 into to the pre-polymer 1102 and the curative 1104, or into a product formed there from, to provide closed cell pores in the ultimately formed polishing pad. Thus, in one embodiment, each closed cell pore has no physical shell. In a combination embodiment, the mixing further includes adding a plurality of porogens 1122 to the pre-polymer 1102 and the curative 1104 to provide a first portion of closed cell pores each having a physical shell, and further injecting a gas 1124 into the pre-polymer 1102 and the curative 1104, or into a product formed there from, to provide a second portion of closed cell pores each having no physical shell. In yet another embodiment, the pre-polymer 1102 is an isocyanate and the mixing further includes adding water ($H_2O$) to the pre-polymer 1102 and the curative 1104 to provide closed cell pores each having no physical shell.

Thus, groove patterns contemplated in embodiments of the present invention may be formed in-situ. Furthermore, alignment features may also be formed simultaneously in the molding fabrication process. For example, as described above, a compression-molding process may be used to form polishing pads with a grooved polishing surface having an alignment feature therein. By using a molding process, highly uniform groove dimensions within-pad may be achieved. Furthermore, extremely reproducible groove dimensions along with very smooth, clean groove surfaces may be produced. Other advantages may include reduced defects and micro-scratches and a greater usable groove depth.

Also, since the fabricated alignment feature is formed during the molding, the positioning of the resulting pad during formation of a pad in a mold can be determined after removal of the pad from the mold. That is, such a molded alignment feature can provide traceability back to the molding process.

Thus, in one embodiment, the polishing body of a polishing pad is a molded polishing body, and an alignment feature included therein indicates a location of a region in a mold used for forming the molded polishing body.

Individual grooves of the groove patterns described herein, including alignment features embodied as groove segments, may be from about 4 to about 100 mils deep at any given point on each groove. In some embodiments, the grooves are about 10 to about 50 mils deep at any given point on each groove. The grooves may be of uniform depth, variable depth, or any combinations thereof. In some embodiments, the grooves are all of uniform depth. For example, the grooves of a groove pattern may all have the same depth. In some embodiments, some of the grooves of a groove pattern may have a certain uniform depth while other grooves of the same pattern may have a different uniform depth. For example, groove depth may increase with increasing distance from the center of the polishing pad. In some embodiments, however, groove depth decreases with increasing distance from the center of the polishing pad. In some embodiments, grooves of uniform depth alternate with grooves of variable depth.

Individual grooves of the groove patterns described herein, including alignment features embodied as groove segments, may be from about 2 to about 100 mils wide at any given point on each groove. In some embodiments, the grooves are about 15 to about 50 mils wide at any given point on each groove. The grooves may be of uniform width, variable width, or any combinations thereof. In some embodiments, the grooves of a concentric polygon pattern are all of uniform width. In some embodiments, however, some of the grooves of a concentric polygon pattern have a certain uniform width, while other grooves of the same pattern have a different uniform width. In some embodiments, groove width increases with increasing distance from the center of the polishing pad. In some embodiments, groove width decreases with increasing distance from the center of the polishing pad. In some embodiments, grooves of uniform width alternate with grooves of variable width.

In accordance with the previously described depth and width dimensions, individual grooves of the groove patterns described herein, including alignment features embodied as groove segments, may be of uniform volume, variable volume, or any combinations thereof. In some embodiments, the grooves are all of uniform volume. In some embodiments, however, groove volume increases with increasing distance from the center of the polishing pad. In some other embodiments, groove volume decreases with increasing distance from the center of the polishing pad. In some embodiments, grooves of uniform volume alternate with grooves of variable volume.

Grooves of the groove patterns described herein may have a pitch from about 30 to about 1000 mils. In some embodiments, the grooves have a pitch of about 125 mils. For a circular polishing pad, groove pitch is measured along the radius of the circular polishing pad. In CMP belts, groove pitch is measured from the center of the CMP belt to an edge of the CMP belt. The grooves may be of uniform pitch, variable pitch, or in any combinations thereof. In some embodiments, the grooves are all of uniform pitch. In some embodiments, however, groove pitch increases with increasing distance from the center of the polishing pad. In some other embodiments, groove pitch decreases with increasing distance from the center of the polishing pad. In some embodiments, the pitch of the grooves in one sector varies with increasing distance from the center of the polishing pad while the pitch of the grooves in an adjacent sector remains uniform. In some embodiments, the pitch of the grooves in one sector increases with increasing distance from the center of the polishing pad while the pitch of the grooves in an adjacent sector increases at a different rate. In some embodiments, the pitch of the grooves in one sector increases with increasing distance from the center of the polishing pad while the pitch of the grooves in an adjacent sector decreases with increasing distance from the center of the polishing pad. In some embodiments, grooves of uniform pitch alternate with grooves of variable pitch. In some embodiments, sectors of grooves of uniform pitch alternate with sectors of grooves of variable pitch.

It is to be understood that although the above embodiments highlight examples and benefits of including alignment features in a polishing region of the polishing surface of a polishing pad, alignment features contemplated herein could, alternatively, be located outside of a region of the polishing surface. Such embodiments would still enable collection of information regarding a molding process used to form the polishing pad. It is also to be understood that single or multiples of alignment features may be included in an individual polishing pad.

Polishing pads described herein may be suitable for use with a variety of chemical mechanical polishing apparatuses. As an example, FIG. 12 illustrates an isometric side-on view of a polishing apparatus compatible with a polishing pad having an alignment feature, in accordance with an embodiment of the present invention.

Figure 12:
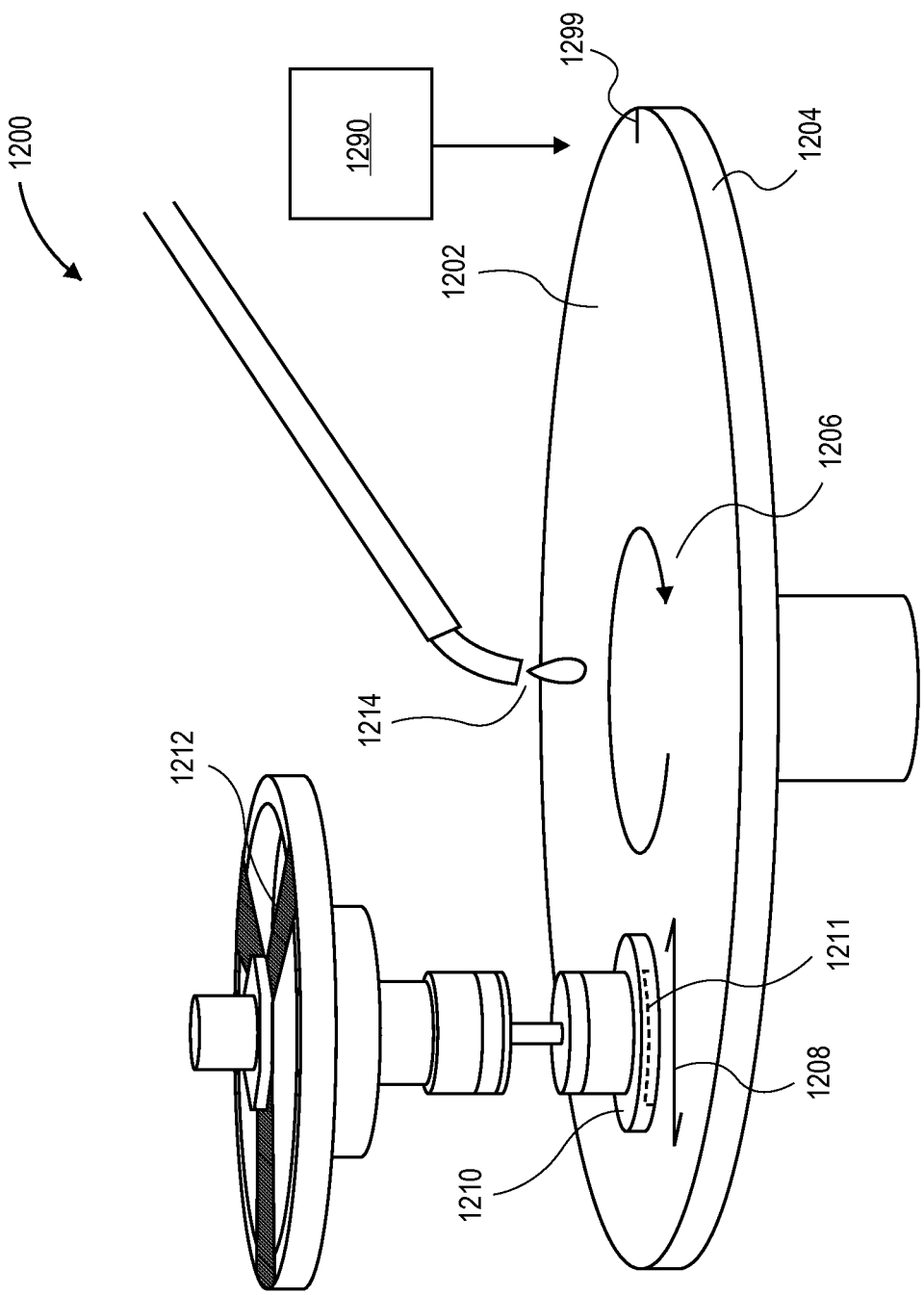
FIG. 12 illustrates an isometric side-on view of a polishing apparatus compatible with a polishing pad having an alignment feature, in accordance with an embodiment of the present invention.

Referring to FIG. 12, a polishing apparatus 1200 includes a platen 1204. The top surface 1202 of platen 1204 may be used to support a polishing pad with a concentric or approximately concentric polygon groove pattern. Platen 1204 may be configured to provide spindle rotation 1206 and slider oscillation 1208. A sample carrier 1210 is used to hold, e.g., a semiconductor wafer 1211 in place during polishing of the semiconductor wafer with a polishing pad. Sample carrier 1210 is further supported by a suspension mechanism 1212. A slurry feed 1214 is included for providing slurry to a surface of a polishing pad prior to and during polishing of the semiconductor wafer. A conditioning unit 1290 may also be included and, in one embodiment, includes a diamond tip for conditioning a polishing pad. In accordance with an embodiment of the present invention, an alignment feature of a polishing pad, such as the alignment features described in association with FIG. 2-10, is positioned for alignment with a feature 1299 on the platen 1204 of polishing apparatus 1200, as depicted in FIG. 12.

Thus, polishing pads with alignment features have been disclosed. In accordance with an embodiment of the present invention, a polishing pad for polishing a substrate includes a polishing body. The polishing body has a polishing surface and a back surface. The polishing surface has a pattern of grooves including a polishing region. The polishing region of the pattern of grooves includes an alignment feature. In one embodiment, the pattern of grooves includes a plurality of circumferential grooves intersecting with a plurality of radial grooves and the alignment feature is one such as, but not limited to, a radial segment groove disposed between two circumferential grooves, a circumferential segment groove disposed between two radial grooves, an interruption in one of the circumferential grooves, or an interruption in one of the radial grooves.

What is claimed is:

1. A polishing pad for polishing a substrate, the polishing pad comprising:
   a polishing body having a polishing surface and a back surface, the polishing surface having a pattern of grooves comprising a polishing region, wherein the polishing region of the pattern of grooves comprises an alignment feature creating a singular asymmetry within the pattern of grooves, wherein the pattern of grooves comprises a plurality of circumferential grooves intersecting with a plurality of radial grooves, and wherein the alignment feature comprises an interruption in one of the circumferential grooves, the interruption disposed between two radial grooves.

2. The polishing pad of claim 1, wherein the alignment feature has a length-wise dimension approximately in the range of $1/8^{th}$ of an inch to $1/4$ of an inch.

3. The polishing pad of claim 1, wherein the alignment feature is adapted to remain throughout the polishing lifetime of the polishing pad.

4. The polishing pad of claim 1, wherein the plurality of circumferential grooves is a plurality of concentric polygons.

5. The polishing pad of claim 1, wherein the alignment feature indicates a location of a detection region disposed in the back surface of the polishing pad.

6. The polishing pad of claim 5, wherein the alignment feature is positioned for alignment with a feature on a platen of a chemical mechanical polishing apparatus.

7. The polishing pad of claim 1, wherein the polishing body is a molded polishing body, and wherein the alignment feature indicates a location of a region in a mold used for forming the molded polishing body.

8. The polishing pad of claim 1, wherein the polishing body is a homogeneous polishing body comprising a thermoset polyurethane material.

9. The polishing pad of claim 1, further comprising:
a local area transparency (LAT) region disposed in the polishing body.

10. A polishing pad for polishing a substrate, the polishing pad comprising:
a polishing body having a polishing surface and a back surface, the polishing surface having a pattern of grooves comprising a polishing region, wherein the pattern of grooves comprises a plurality of circumferential grooves intersecting with a plurality of radial grooves, and wherein the polishing region of the pattern of grooves comprises an alignment feature comprising an interruption in one of the circumferential grooves, the interruption disposed between two radial grooves.

11. The polishing pad of claim 10, wherein the alignment feature has a length-wise dimension approximately in the range of $1/8^{th}$ of an inch to $1/4$ of an inch.

12. The polishing pad of claim 10, wherein the alignment feature is adapted to remain throughout the polishing lifetime of the polishing pad.

13. The polishing pad of claim 10, wherein the plurality of circumferential grooves is a plurality of concentric polygons.

14. The polishing pad of claim 10, wherein the polishing body is a molded polishing body, and wherein the alignment feature indicates a location of a region in a mold used for forming the molded polishing body.

15. The polishing pad of claim 10, wherein the polishing body is a homogeneous polishing body comprising a thermoset polyurethane material.

16. The polishing pad of claim 10, further comprising:
a local area transparency (LAT) region disposed in the polishing body.

* * * * *